: 3,304,182
Patented Feb. 14, 1967

3,304,182
LIGHT-SENSITIVE COLOR PHOTOGRAPHIC LAYERS
Alfred Froehlich, Marly-le-Grand, Switzerland, assignor to Ciba Limited, Basel, Switzerland, a Swiss company
No Drawing. Filed June 11, 1963, Ser. No. 286,941
Claims priority, application Switzerland, June 14, 1962, 7,213/62
12 Claims. (Cl. 96—100)

The present invention provides light-sensitive photographic layers for the color coupling development process which contain as dye former for the magenta dye a quinoline compound carrying a cyanacetyl group in 4-position of a quinoline radical and a further substituent in at least one of the 2- and 3-positions.

These compounds thus contain at least one quinoline ring with a cyanacetyl group in 4-position of the formula (1)
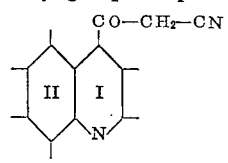

A further substituent is present in the nitrogen-containing six-membered ring I in 2- or 3-position or both these positions may be occupied by further substituents. It is of advantage to use those quinoline compounds which contain in one of the indicated positions a substituent that hinders diffusion. The isocyclic six-membered ring II, condensed with the nitrogen-containing six-membered ring, may likewise carry substituents.

Thus, for example, the following quinoline compounds give valuable results:

(a) The afore-mentioned quinoline compounds that contain in addition to a cyanacetyl group in 4-position a substituent that hinders diffusion in 2- and/or 3-positions of the quinoline radical.

(b) Quinoline compounds that contain a cyanacetyl group in each of the 2- and 4-positions of the quinoline radical and in which the 3-position may be unsubstituted or substituted that hinders diffusion.

(c) Quinoline compounds containing a cyanacetyl group in each of the 3- and 4-positions of the quinoline radical and which may likewise contain a further substituent in 2-position of the nitrogen-containing six-membered ring I.

Instead of single substituents the isocyclic six-membered ring II may carry fused-on ring systems, for example a benzene ring in positions 5:6 or 7:8.

Special mention may also be made of quinoline compounds that contain, in addition to the cyanacetyl group in 4-position, a hydrocarbon radical with at least 3, or preferably with at least 6 carbon atoms in 2-position. The hydrocarbon radical may be, for example, an isopropyl, benzene, diphenyl, dodecyl, heptadecal or octadecyl radical.

As substituents in ring II the following may be mentioned: benzene radicals, acylamino groups, further quinoline radicals which themselves may be substituted, alkoxy groups such as ethoxy or methoxy, alkyl groups such as ethyl or methyl, and halogen atoms such as chlorine or bromine.

Valuable color couplers are, for example, the compounds of the formula (2)
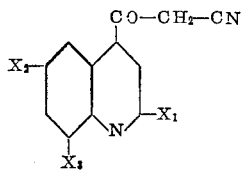

wherein $X_1$ represents a substituent that hinders diffusion, preferably a hydrocarbon radical with at least 6 carbon atoms, and $X_2$ and $X_3$ may be identical or different and each represents a hydrogen or halogen atom or a lower alkyl or lower alkoxy group.

Further valuable color couplers are the compounds of the formula (3)
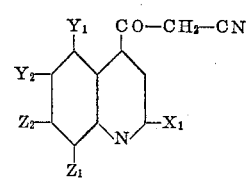

wherein $X_1$ stands for a substituent that hinders diffusion, preferably a hydrocarbon radical with at least 6 carbon atoms, one of the pair of substituents $Y_1$, $Y_2$ and $Z_1$, $Z_2$ represents hydrogen atoms and the other represents the complement to a fused-on benzene ring. This definition thus includes the two cyclic systems of the formulae (4)
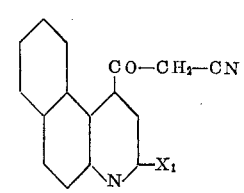

and (5)
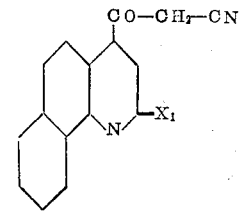

The 4-cyanacetylquinolines to be used in the present process are new; they are advantageously obtained by reacting a quinoline-4-carboxylic acid ester with acetonitrile in the presence of an alkali metal, or a compound having a similar action, such as an alkali metal alcoholate or sodamide. The quinoline-4-carboxylic acid esters required for this reaction can be prepared by known methods, for example by reacting an isatin with a methyl-ketone, followed by esterification of the quinoline 4-carboxylic acid thus formed. If desired, further substituents may be introduced into the 4-cyanacetyl-quinolines thus obtained, for example, such compounds may be nitrated, then reduced and acylated at the amino group.

According to this invention the quinoline compounds of the constitution defined above are used as dye formers for magenta dyes in light-sensitive photographic layers. Those quinoline compounds which contain a cyanacetyl group in 4-position of the quinoline radical and a further substituent in 2- and/or 3-position, are relatively easy to manufacture. Many of the magenta dyes formed with these quinoline compounds in the color coupling process display very advantageous absorption properties; they retain green light very well and do not display any appreciable absorption in the blue and the red ranges of the spectrum. By suitably selecting the substituents the tint can be controlled.

The incorporation of the quinoline compounds in the light-sensitive layer and the production of the color-photographic images can be carried out in the usual manner. In the form of their salts, more especially their alkali metal salts, the quinoline compounds are soluble in water and can be mixed with the color developer or with the emulsion prior to casting the latter.

Unless otherwise indicated, parts and percentages in the following manufacturing directions A to Q and in the examples are by weight.

(A) *2-diphenyl-4-cyanacetylquinoline*

(6) 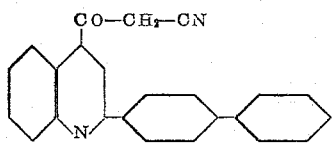

A solution of 26 grams of 4-acetyl-para-diphenyl in 300 cc. of ethanol is added to a solution of 20 grams of isatin in 70 cc. of water and 20 grams of caustic potash. The batch is stirred for 10 hours at 90° C., acidified with acetic acid, cooled, suction-filtered, and the filter residue washed with methanol. Yield: 41 grams. Melting point: 294° C.

41 grams of the resulting acid are boiled for 12 hours with 400 cc. of methanol and 35 cc. of 96% sulfuric acid, then poured on to ice, adjusted with potassium carbonate to pH=10, suction-filtered, washed copiously with water, dried, and the product is recrystallized from benzene. Yield: 31 grams. Melting point: 151° C.

A mixture of 150 cc. of anhydrous benzene, 20.5 grams of diphenylylquinoline-4-carboxylic acid methyl ester and sodium methylate (obtained from 1.8 grams of sodium) is boiled for 1 hour, whereupon 10 cc. of acetonitrile are slowly added and the whole is boiled for 10 hours, then cooled to room temperature, filtered, and the filter residue washed with benzene and ether. Yield: 18 grams.

(B) *2-phenyl-4-cyanacetyl-7:8-benzoquinoline*

(7) 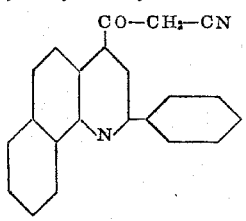

2-phenyl-7:8-benzoquinoline-4-carboxylic acid is esterified with methanol as described under (A) above. Melting point of the ester: 172° C. 20 grams of the resulting ester are reacted, likewise as described under (A) above, in anhydrous benzene with sodium ethylate (obtained from 2.5 grams of sodium) and with 15 cc. of acetonitrile.

(C) *Bis-[2-phenyl-4-cyanacetylquinolyl-(6)]*

(8) 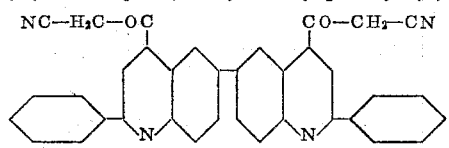

This compound is obtained by the process described under (A) above by using the corresponding dicarboxylic acid dimethyl ester as starting material.

(D) *7-stearoylamino-2:4-di-(cyanacetyl)-quinoline*

9) 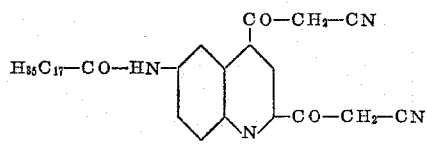

20 grams of quinoline-2:4-dicarboxylic acid are heated with 60 cc. of concentrated sulfuric acid to 100° C., and at this temperature 20 grams of potassium nitrate are slowly added. The temperature is maintained for another 2 hours at 80 to 100° C., the mixture poured on to ice and sufficient caustic soda added to render the solution substantially neutral. The reaction mixture is cooled with ice for 12 hours, suction-filtered, washed with ice water and dried. Yield: 23 grams. Melting point: 223° C.

250 grams of the resulting nitro compound are reduced with 2 liters of water, 20 cc. of concentrated hydrochloric acid and 120 grams of iron. Yield: 200 grams of crude product.

A mixture of 200 grams of the crude amine, 700 cc. of methanol and 162 grams of sulfuric acid is boiled for 12 hours, then poured on to ice, neutralized with sodium carbonate and suction-filtered. After washing with water and drying, the product is recrystallized from a 1:1 mixture of benzene and benzine in the presence of active carbon. Yield: 115 grams. Melting point: 127° C.

35.5 grams of the amine are dissolved in 300 cc. of pyridine and mixed at the boil with 80 cc. of stearyl chloride. The mixture is heated for 10 minutes at the boil, then poured on to a mixture of 3 kg. of ice and ½ liter of hydrochloric acid, suction-filtered, and the residue washed with water and 300 cc. of methanol. The product is recrystallized from methanol and then twice again from petroleum ether. Yield: 45 grams. Melting point: 131° C.

The resulting 7-stearoylaminoquinoline-2:4-di-(carboxylic acid methyl ester) is converted with sodium ethylate and acetonitrile into the di-cyanacetyl compound by the method described under (A) above.

(E) *2-para-stearoylaminophenyl-4-cyanacetylquinoline*

(10) 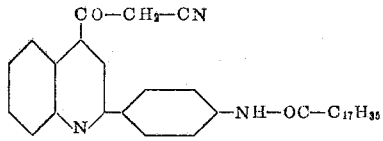

2-(4'-aminophenyl)-cinchoninic acid is esterified with methanol. (Melting point of the methyl ester: 122° C.)

32 grams of the ester are dissolved in 200 cc. of pyridine and 42 cc. of stearyl chloride are added at the boil. The batch is boiled for another 10 minutes, then poured on to a mixture of 1 kg. of ice and 300 cc. of concentrated hydrochloric acid and suction-filtered. The residue is stirred with dilute ethanol, suction-filtered, washed with water and recrystallized from benzene. Yield: 40 grams. Melting point: 135° C. The reaction with sodium ethylate and acetonitrile is carried out as under (A) above.

(F) *2-para-octadecyl-hydroxyphenyl-4-cyanacetyl-quinoline*

(11) 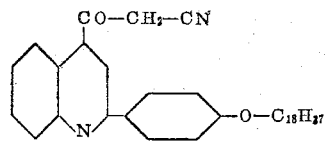

68 grams of para-hydroxyacetophenone are converted into the sodium salt which is then heated with 167 grams of octadecyl bromide for 4 hours at 200° and for 1 hour at 250° C. Recrystallization from alcohol and petroleum ether yield a product melting at 71° C.

55 cc. of alcohol are added to a solution of 16.2 grams of isatin in 30 cc. of water and 25 grams of potassium hydroxide, and a solution of 38 grams of paraoctadecyl-hydroxyacetophenone is stirred in. The whole is stirred for 12 hours on a boiling water bath, mixed with 700 cc. of methanol, acidified with acetic acid, cooled, suction-filtered, and the filter cake washed with methanol and recrystallized from glacial acetic acid. Yield: 38 grams. Melting point: 166° C.

A mixture of 185 grams of the resulting carboxylic acid, 1 liter of absolute methanol, 185 cc. of 96% sulfuric acid and 1 liter of benzene is stirred for 12 hours on a boiling water bath. 1 liter of methanol is then added, the whole is cooled, suction-filtered, and the filter residue heated with 4 liters of methanol; 300 cc. of ammonia are then added; the batch is stirred for some time, cooled, suction-filtered, and the filter cake washed with methanol and recrystallized from benzene. Yield: 140 grams. Melting point: 97° C.

The reaction with sodium ethylate and acetonitrile is carried out as described above under (A).

(G) *2-octadecylphenyl-4-cyanacetylquinoline*

(12)
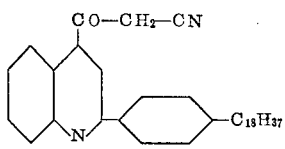

Benzene is converted with stearyl chloride in the presence of aluminum chloride into stearoylbenzene which is then reduced to form octadecylbenzene. The latter product is condensed with acetyl chloride to para-octadecyl-acetophenone melting at 46° C. From the latter product and isatin, 2-octadecylphenylquinoline-4-carboxylic acid (melting at 152° C.) and the methyl ester of this acid (melting at 55° C.) are prepared in known manner and, as described under (A) above, the cyanacetyl compound.

(H) *2-heptadecyl-4-cyanacetylquinoline*

(13)
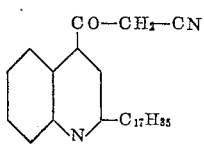

Methylheptadecylketone (melting at 39 to 40° C.) is prepared in known manner by boiling stearoylacetic acid ethyl ester with sulfuric acid and condensed with isatin to form 2-heptadecylquinoline-4-carboxylic acid (melting at 125° C.), and this acid is then esterified with methanol. The ester melts at 67° C.

14 grams of the above ester are boiled for 1 hour with 100 cc. of benzene and sodium methylate (prepared from 3 grams of sodium), then mixed with 10 cc. of acetonitrile, boiled for another 12 hours and the batch suction-filtered while still hot. The filtrate is evaporated to dryness, and the residue recrystallized from acetone. Yield: 11 grams.

The quinoline compounds of the formulae 14 to 17 prepared in an analogous manner.

(I) *2-heptadecyl-4-cyanacetyl-6:8-dichloroquinoline*

(14)
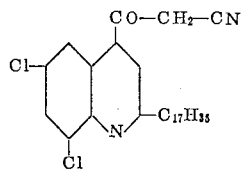

(K) *2-heptadecyl-4-cyanacetyl-6:8-dibromoquinoline*

(15)
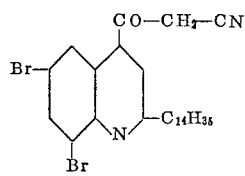

(L) *2-heptadecyl-4-cyanacetyl-6-methylquinoline*

(16)
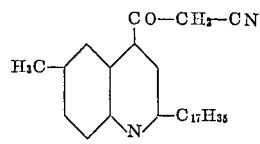

(M) *2-heptadecyl-4-cyanacetyl-6-methoxyquinoline*

(17)
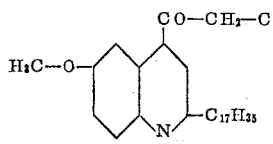

(N) *2-dodecyl-4-cyanacetyl-7:8-benzoquinoline*

(18)
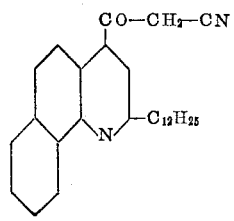

26.7 grams of naphthisatin dissolved in 180 cc. of water and 60 grams of potassium hydroxide and mixed with a solution of 39 grams of methyllaurylketone in 500 cc. of isopropanol. The batch is boiled for 48 hours, precipitated with ice and hydrochloric acid, suction-filtered, and the filter cake washed with methanol. Yield: about 21 grams after three recrystallizations from benzene. Melting point: 133–134° C.

A mixture of 17 grams of this carboxylic acid, 100 cc. of benzene, 800 cc. of methanol and 20 cc. of 96% sulfuric acid is boiled for 12 hours. The ester (melting at 60° C.) is obtained after working up and recrystallization from petroleum ether.

1 gram of potassium is slowly stirred at the boil into a solution of 4.1 grams of the above ester in 80 cc. of benzene and 15 cc. of acetonitrile. After boiling the mixture for 6 hours, the benzene is evaporated, and the residue taken up in ether, washed with ether and recrystallized from benzene. Yield: 3.1 grams.

(O) *2-isopropyl-4-cyanacetyl-5:6-benzoquinoline*

(19)
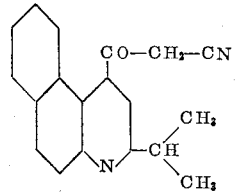

2-isopropyl-4-naphthaloquinolinic acid is esterified with methanol in the usual manner, and the ester reacted with acetonitrile, as described under (A) above, in the presence of sodium ethylate.

(P) *2:4-di-(cyanacetyl)-3-heptadecylquinoline*

(20)
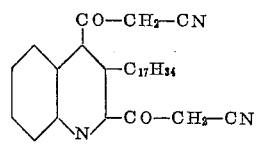

The 3-hepthadecylquinoline-2:4-dicarboxylic acid obtained by reacting isatin with octadecyl-pyruvic acid is esterified with methanol, and the ester converted into the dicyanethyl compound with sodium and acetonitrile.

(Q) *2-methyl-3:4-di-(cyanacetyl)-quinoline*

(21)
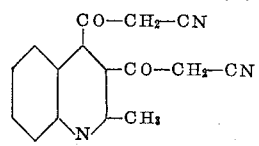

By reacting acetoacetic ester with potassium isatinate in a potassium hydroxide solution 2-methyl-quinoline-3:4-dicarboxylic acid is obtained from which the diester is prepared in the usual manner by boiling in methanol and sulfuric acid. By reacting the diester with acetonitrile and potassium as described under (N) above, 2-methyl-3:4-di-(cyanacetyl)-quinoline is obtained.

EXAMPLE 1

A solution containing 10 grams of one of the compounds of the Formulae 6 to 21 in the form of its potassium salt in 200 cc. of water and 100 cc. of methanol is added to 1 liter of a silver halide emulsion. The emulsion is then cast on a suitable support. The material so coated is exposed and developed with a color developer (for example 1 - amino - 4 - dimethylaminobenzene), bleached and fixed. A magenta color image is obtained.

The absorption maxima of the magenta tints thus obtained vary according to the color coupler used. Thus, for example, 2-heptadecyl - 4 - cyanacetyl-6:8-dichloroquinoline of Formula 14 produces a relatively longwave absorption maximum, whereas that obtained with 2-heptadecyl-4-cyanacetyl-quinoline of Formula 13 is in the shortwave range.

EXAMPLE 2

A solution of 12 grams of the sodium salt of 1-hydroxy-2-naphthoyl-octadecylamine-4-sulfonic acid in 300 cc. of water is added to 1 liter of a silver halide emulsion sensitized to red, and the whole cast on a support. An orthochromatically sensitized silver halide emulsion containing 10 grams per kg. of the 2-heptadecyl-4-cyanacetylquinoline described under (H) above is then cast on the coated base. The last-mentioned layer is topped with a yellow filter layer and the latter with a silver halide emulsion containing 15 grams per kg. of stearoylacetylamino-isophthalic acid. This tripack material can be used for the production of color photographic images by the usual methods. The blue image is formed in the bottom layer, the magenta image in the intermediate layer and the yellow image in the top layer.

EXAMPLE 3

5 grams of 2-isopropyl-4-cyanacetyl-5:6-benzoquinoline of the Formula 19 are dissolved in 1000 grams of methanol with addition of 10 cc. of 10% aqueous sodium hydroxide solution and added to a developer of the following composition:

| | | |
|---|---|---|
| Water | cc | 1000 |
| Anhydrous sodium sulfite | grams | 2 |
| Potassium bromide | do | 0.5 |
| Anhydrous sodium carbonate | do | 75 |
| 1-N-hydroxyethyl-N-ethylamino-4-aminobenzene | grams | 4.5 |

An exposed silver halide emulsion on a support is treated for 10 minutes in this developer, then rinsed for 15 minutes and finally bleached in the bath described below and fixed.

| | | |
|---|---|---|
| Water | cc | 1000 |
| Anhydrous sodium carbonate | grams | 8 |
| Ethylenediamine-tetraacetic acid | do | 15 |
| Potassium ferricyanide | do | 30 |
| Potassium bromide | do | 10 |
| Crystalline sodium thiosulfate | do | 200 |

The resulting magenta image is formed from the oxidation product of the developer and the dye coupler which has been added to the developer.

What I claim is:

1. A silver halide light-sensitive photographic layer for use in the color coupling development process, containing as the color former for the magneta dye a quinoline which contains a cyanacetyl group in 4-position of the quinoline radical and in at least one of the 2- and 3-positions a substituent selected from the group consisting of a cyanacetyl radical, a hydrocarbon radical with at least 3 carbon atoms, an acylaminobenzene radical the acyl group of which contains at least 3 carbon atoms and an alkoxybenzene group the alkyl group of which contains at least 3 carbon atoms.

2. A silver halide light-sensitive photographic layer for use in the color coupling development process, containing as the color former for the magneta dye a quinoline which contains a cyanacetyl group in each of the positions 2 and 4 of the quinoline radical.

3. A silver halide light-sensitive photographic layer for use in the color coupling development process, containing as the color former for the magenta dye a quinoline which contains a cyanacetyl group in each of the positions 3 and 4 of the quinoline radical.

4. A silver halide light-sensitive photographic layer for use in the color coupling development process, containing as the color former for the magneta dye a quinoline which contains a cyanoacetyl group in each of the posihydrocarbon radical with at least 3 carbon atoms in 2-position of the quinoline radical.

5. A silver halide light-sensitive photographic layer for use in the color coupling development process, containing as the color former for the magenta dye a quinoline of the formula

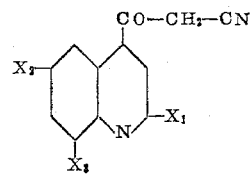

wherein $X_1$ represents a hydrocarbon radical with at least 6 carbon atoms and $X_2$ and $X_3$ each represents a member selected from the group consisting of a hydrogen atom, a halogen atom, a lower alkyl group and a lower alkoxy group.

6. A silver halide light-sensitive photographic layer for use in the color coupling development process, containing as the color former for the magenta dye a quinoline of the formula

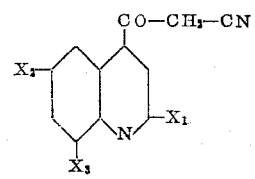

wherein $X_1$ represents an acylaminobenzene radical the acyl group of which contains at least 3 carbon atoms and $X_2$ and $X_3$ each represents a member selected from the group consisting of a hydrogen atom, a halogen atom, a lower alkyl group and a lower alkoxy group.

7. A silver halide light-sensitive photographic layer for use in the color coupling development process, containing as the color former for the magenta dye a quinoline of the formula

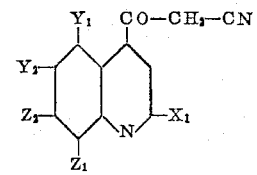

wherein $X_1$ represents a substituent selected from the group consisting of a cyanacetyl radical, a hydrocarbon radical with at least 3 carbon atoms, an acylaminobenzene radical the acyl group of which contains at least 3 carbon atoms and an alkoxybenzene group the alkyl group of which contains at least 3 carbon atoms, one of the pairs $Y_1$, $Y_2$ and $Z_1$, $Z_2$ represents hydrogen atoms and the other represents the radical of a fused-on benzene ring.

8. A silver halide light-sensitive photographic layer for use in the color coupling development process, containing as the color former for the magenta dye the quinoline of the formula

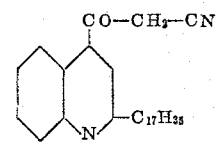

9. A silver halide light-sensitive photographic layer for use in the color coupling development process, containing as the color former for the magenta dye the quinoline of the formula

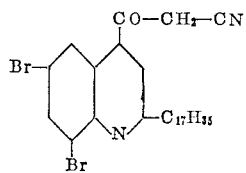

10. A silver halide light-sensitive photographic layer for use in the color coupling development process, containing as the color former for the magenta dye the quinoline of the formula

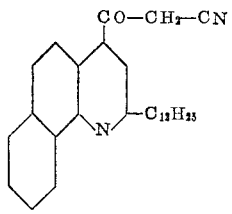

11. A silver halide light-sensitive photographic layer for use in the color coupling development process, containing as the color former for the magenta dye the quinoline of the formula

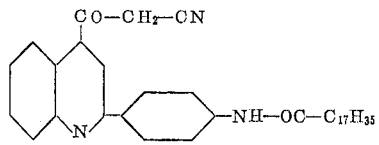

12. In a process for the production of a color-photographic magenta image with the aid of a color coupler the step which comprises developing the magenta image by the reaction of a quinoline which contains a cyanacetyl group in 4-position of the quinoline radical and in at least one of the 2- and 3-positions a substituent selected from the group consisting of a cyanacetyl radical, a hydrocarbon radical with at least 3 carbon atoms, an acylaminobenzene radical the acyl group of which contains at least 3 carbon atoms and an alkoxybenzene group the alkyl group of which contains at least 3 carbon atoms as a color coupler with a color developer.

References Cited by the Examiner
UNITED STATES PATENTS
2,680,730   6/1954   Martin _____ 96—100

NORMAN G. TORCHIN, *Primary Examiner.*

J. T. BROWN, *Assistant Examiner.*

UNITED STATES PATENT OFFICE
CERTIFICATE OF CORRECTION

Patent No. 3,304,182                                   February 14, 1967

Alfred Froehlich

It is hereby certified that error appears in the above numbered patent requiring correction and that the said Letters Patent should read as corrected below.

Column 8, line 7, for "in each of the posi-" read -- 4-position and a --.

Signed and sealed this 21st day of November 1967.

(SEAL)
Attest:

Edward M. Fletcher, Jr.

Attesting Officer

EDWARD J. BRENNER

Commissioner of Patents